(12) United States Patent
Han

(10) Patent No.: US 7,559,337 B2
(45) Date of Patent: Jul. 14, 2009

(54) RETRACTABLE FLOAT FOR A BALLCOCK VALVE

(75) Inventor: Joseph Han, Irvine, CA (US)

(73) Assignee: Fluidmaster, Inc., San Juan Capistrano, CA (US)

( * ) Notice: Subject to any disclaimer, the term of this patent is extended or adjusted under 35 U.S.C. 154(b) by 0 days.

(21) Appl. No.: 11/818,861

(22) Filed: Jun. 15, 2007

(65) Prior Publication Data
US 2007/0295408 A1    Dec. 27, 2007

Related U.S. Application Data

(60) Provisional application No. 60/815,055, filed on Jun. 19, 2006.

(51) Int. Cl.
*F16K 31/18* (2006.01)
(52) U.S. Cl. .................. 137/445; 137/426; 137/429
(58) Field of Classification Search ............. 137/390, 137/412, 420, 426, 429, 445, 449; 4/324, 4/325, 415; 411/386; 441/1
See application file for complete search history.

(56) References Cited

U.S. PATENT DOCUMENTS

| 236,311 | A | * | 1/1881 | Doherty | 137/445 |
| 520,203 | A | * | 5/1894 | Claffey | 137/426 |
| 700,316 | A | * | 5/1902 | Flagg | 137/416 |
| 1,027,965 | A | * | 5/1912 | Young | 137/445 |
| 1,167,776 | A | * | 1/1916 | Minekime | 137/449 |
| 1,279,468 | A | * | 9/1918 | Smith | 137/444 |
| 1,703,984 | A | * | 3/1929 | Braselton et al. | 137/390 |
| 2,144,345 | A | * | 1/1939 | Schlecker | 137/445 |
| 2,649,772 | A | * | 8/1953 | Smith | 137/445 |
| 2,715,413 | A | * | 8/1955 | Bold | 137/429 |
| 2,734,524 | A | * | 2/1956 | Burriss | 137/426 |
| 2,833,302 | A | * | 5/1958 | Smith | 137/426 |
| 2,970,488 | A | * | 2/1961 | Skillings | 137/429 |
| 4,655,244 | A | * | 4/1987 | Park | 137/412 |
| 4,657,462 | A | * | 4/1987 | Hoen | 411/552 |
| 5,016,295 | A | * | 5/1991 | Criswell | 4/324 |
| 5,072,751 | A | * | 12/1991 | Lin | 137/429 |
| 6,325,095 | B1 | * | 12/2001 | Kim | 137/426 |

OTHER PUBLICATIONS

Notification of Transmittal of the International Search Authority, Written Opinion for International Application No. PCT/US2007/14425 dated Oct. 6, 2008, 11 pages.

* cited by examiner

*Primary Examiner*—John Rivell
*Assistant Examiner*—Craig Price
(74) *Attorney, Agent, or Firm*—Gordon & Rees LLP

(57) ABSTRACT

A collapsible floating apparatus for controlling a valve includes a floating device and a collapsible lever. The collapsible lever includes a first member rotatably coupled to the valve, and a second member attached to the floating device at one end and rotatably coupled to the first member adjacent another end. The apparatus has a retracted position for shipping and storage, and operational positions. In the position, the second member, or the first and second members together, are brought adjacent to the valve. In operational positions, the first and second members act as a single lever to relay the buoyancy of the floating device drives to the valve. An adjusting member is provided for adjusting a relative position or angle between the first and second members, which in turn adjusts a water level.

2 Claims, 5 Drawing Sheets

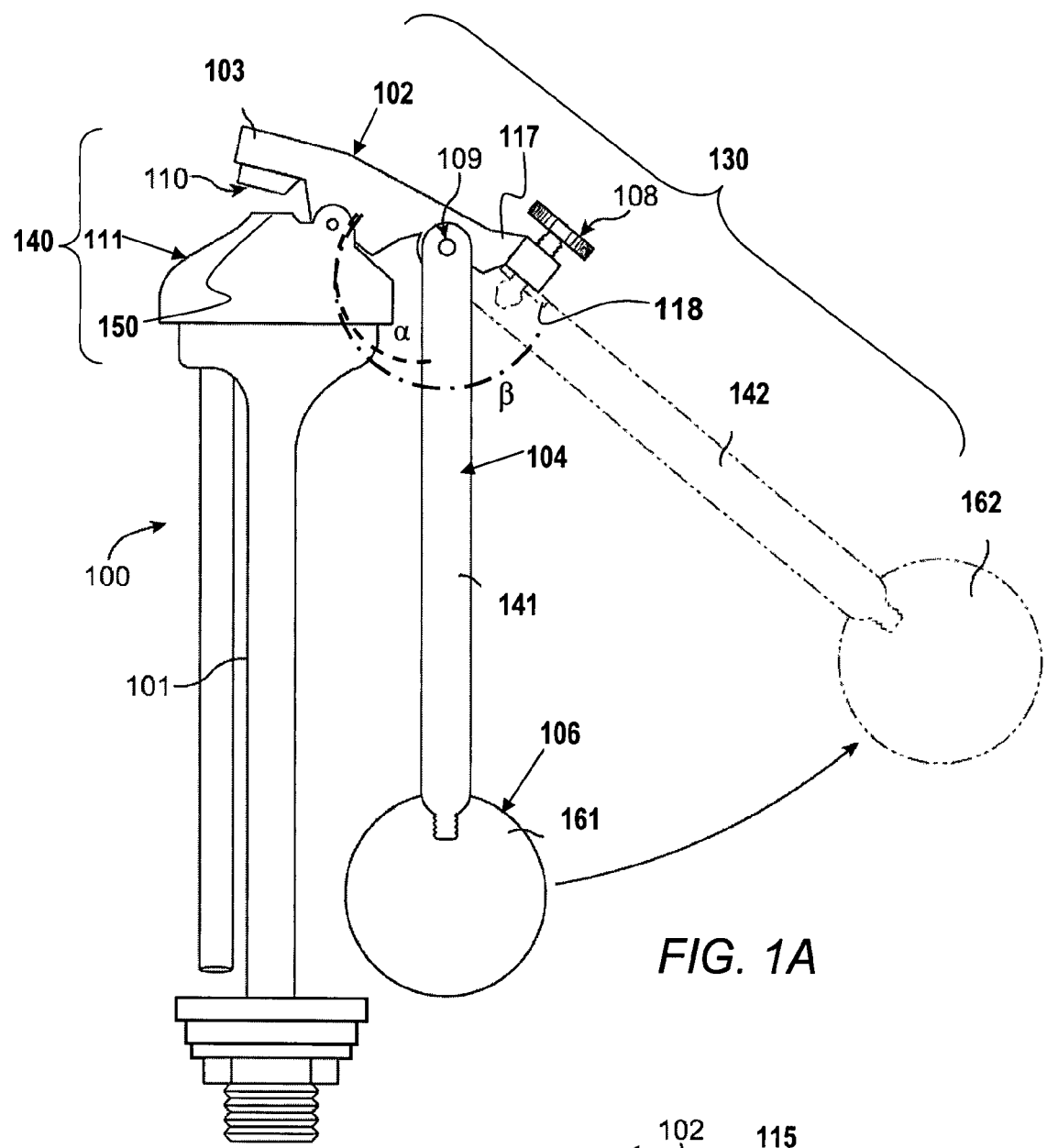
FIG. 1A
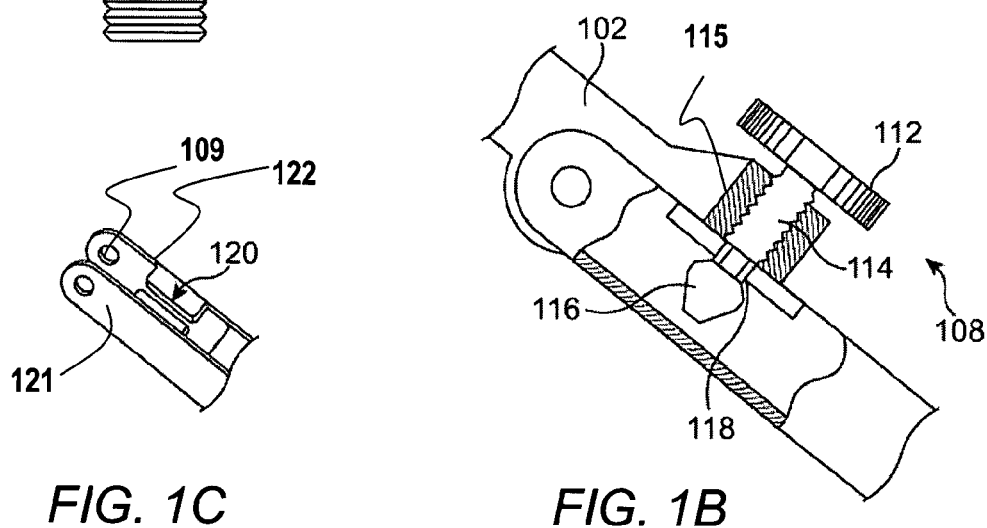
FIG. 1C
FIG. 1B

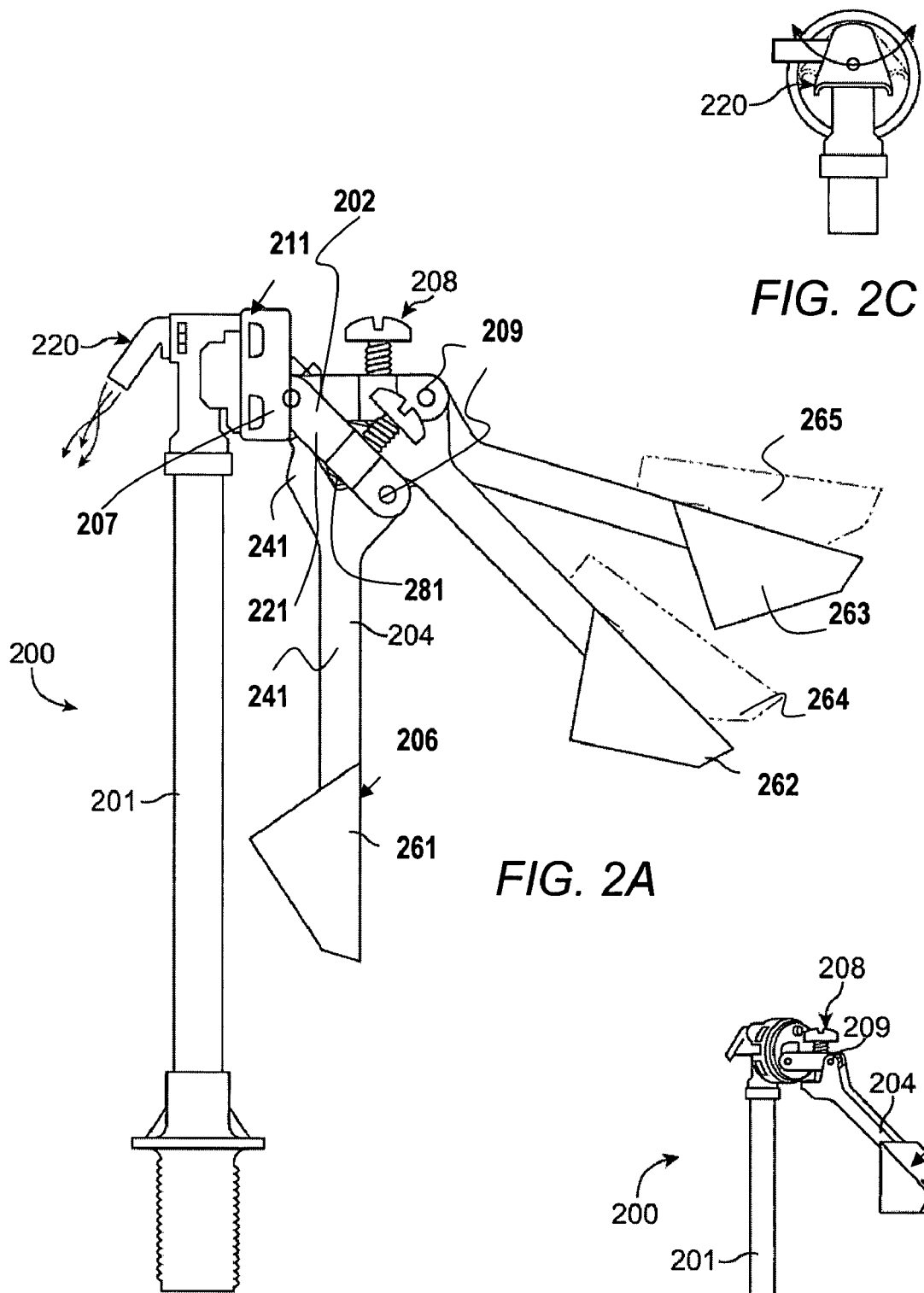
FIG. 2C
FIG. 2A
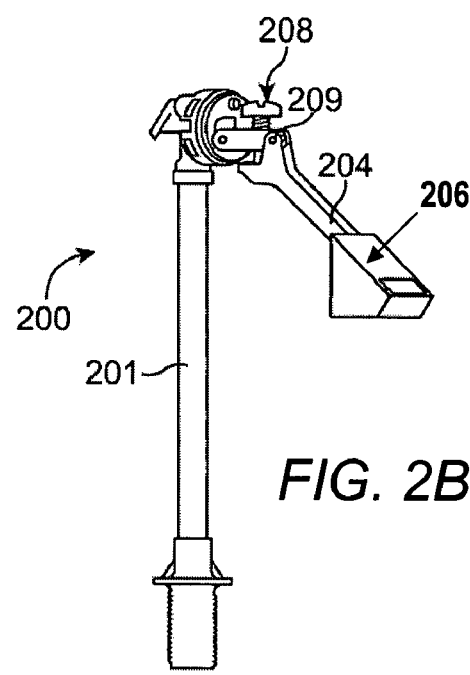
FIG. 2B

RETRACTABLE FLOAT FOR A BALLCOCK VALVE

RELATED APPLICATIONS

This application relates to, claims priority from, and incorporates herein by reference, as if fully set forth, U.S. Provisional Patent Application Ser. No. 60/815,055 filed on Jun. 19, 2006 and entitled "RETRACTABLE FLOAT, PILOT BALLCOCK VALVE."

BACKGROUND OF THE INVENTION

1. Field of the Invention

The present invention relates generally to toilet flushing systems and particularly to valves for toilets.

2. Description of Prior Art and Related Information

Conventional toilet tanks employ plug and flapper tank valves that are levered open, which remain open while a full tank is emptied. A piston-operated ballcock valve is open whenever the water level in the tank is below a predetermined level. While the ballcock valve is open, part of its total flow is diverted to refill the bowl at the same time the tank is being refilled by the valve.

The piston is driven by a float. The float may be a wrap-around float, which partially wraps around a main step of a water riser that supplies water to the tank through the ballcock valve. A wrap-around float is usually bulky in order to provide sufficient buoyancy for driving the valve piston. Alternatively, a ball-shaped float attached at an end of a long rod may be used as the driving force for the piston, to take advantage of the lever effect provided by the long rod. Thus, a smaller float is needed as compared to the wrap-around float. However, the resting positions of the ball float are relatively distant from the main stem of the valve. Accordingly, conventional ballcock valves are packaged with the rod and the float unassembled, as the rod and the float take too much space and are susceptible to damages if packaged and transported fully assembled. In addition, it is a rather complex operation to adjust the predetermined water level with conventional valve systems.

SUMMARY OF THE INVENTION

The present invention provides structures and methods which overcome the deficiencies in the prior art.

In one aspect, a collapsible floating apparatus is provided for controlling a ballcock valve. The apparatus includes a floating device for providing a buoyancy to drive the valve, and a collapsible lever coupled to the floating device and the valve.

The collapsible lever may include a first member movably coupled to the valve, and a second member movably coupled to the first member. The apparatus may further include an adjusting member for adjusting a relative position or angle between the first member and the second member.

In one embodiment, the apparatus further includes a locking mechanism for locking the second member with the first member when the second member is moved from a retracted position to an operational position. The locking mechanism may include a lock head attached to a tip of the adjusting member, wherein the adjusting member is attached to the first member, and a receptacle slot on the second member for catching and retaining the lock head at the operational position. The receptacle slot may be formed with two jaws extending from an end of the second member, each jaw having a hinge post, and wherein the hinge posts are adapted to receive a hinge pin coupled with the first member for rotatably coupling the first member with the second member. The lock head may be substantially conical shaped. The adjusting member may have an adjusting knob and an externally threaded section, the externally threaded section mates through an internally threaded section of the first member and connects to the lock head.

In another embodiment, the apparatus further includes a shuttle stem coupled to the first member for translating a rotational motion of the first member into a substantially horizontal motion to drive the apparatus. The first member may further include an elongated chamber for retaining a ball-shaped end of the shuttle stem and for enabling a motion of the ball-shaped end in the elongated direction.

In one embodiment, the second member has a first arm, and wherein the adjusting member is adapted to press the first arm causing a change in the relative position or angle between the first member and the second member for adjusting an operational position of the second member that in turn determines a water level.

In one embodiment, the locking mechanism is adapted to lock the first member into a retracted position or into an operational position, and may include a ratchet device attached to the valve.

In another embodiment, the locking mechanism includes a cantilever arm attached to the valve, and a tip attached to the first member that is slidable along the cantilever arm.

The adjusting member may include a substantially ball-shaped head rotatable about an axis of the adjusting member within a ball joint of the second member.

In another aspect, a collapsible floating apparatus for driving a valve is provided. The apparatus includes a floating device for providing a buoyancy to drive the valve, a collapsible lever comprising a first movable member coupled to the valve and a second movable member coupled to the floating device, and an adjusting member for adjusting a relative position or angle between the first member and the second member, the relative position or angle between the first member and the second member in turn adjusts a water level in the tank.

In a preferred embodiment, the collapsible floating apparatus has a retracted position and an operational position. In the collapsed position the second member is in a rotated position toward the valve main body relative to the first member. Alternatively, in the collapsed position the first member is in a rotated position toward the valve main body.

In another aspect, a method for assembling a toilet valve system having a valve for refilling a tank with fluid is provided. The method includes providing a floating apparatus having a collapsible lever coupled to a floating device, and adjusting the collapsible lever from a collapsed position to a first operational position.

Preferably, the collapsible lever has a first member rotatably coupled to the valve, and a second member rotatably coupled to the first member and attached to the floating device, and adjusting the collapsible lever includes rotating the second member relative to the first member and locking the second member with the first member.

In another preferred embodiment, adjusting the collapsible lever includes rotating the first member about the valve while the second member is at a fixed position relative to the first member.

The method may further include adjusting the floating apparatus from a first operational position to a second operational position by adjusting a relative position or angle between the first member and the second member, each operational position corresponding to a different fluid level in the tank;

In summary, a collapsible floating apparatus for controlling a valve includes a floating device and a collapsible lever. The collapsible lever includes a first member rotatably coupled to the valve, and a second member attached to the floating device at one end and rotatably coupled to the first member adjacent another end. The apparatus has a retracted position for shipping and storage, and operational positions. In the retracted position, the second member, or the first and second members together, are brought adjacent to the valve. In operational positions, the first and second members act as a single lever to relay the buoyancy of the floating device drives to the valve. An adjusting member is provided for adjusting a relative position or angle between the first and second members, which in turn adjusts a water level.

The invention, now having been briefly summarized, may be better appreciated by the following detailed description.

BRIEF DESCRIPTION OF THE DRAWINGS

FIG. 1A is a side view of a first preferred embodiment of the ballcock valve system according to the invention, showing a piston-driven ballcock valve;

FIG. 1B is a cross-sectional side view of a preferred adjusting member in the first embodiment;

FIG. 1C is a perspective view of a receptacle slot in the first embodiment;

FIG. 2A is a side view of a second preferred embodiment of the ballcock valve system of the invention, showing a pilot-driven ballcock valve;

FIG. 2B is a perspective view of the second embodiment of the ballcock valve system;

FIG. 2C is a perspective view of a discharge water chute in the second embodiment;

DETAILED DESCRIPTION OF THE PREFERRED EMBODIMENTS

Figure 3A:
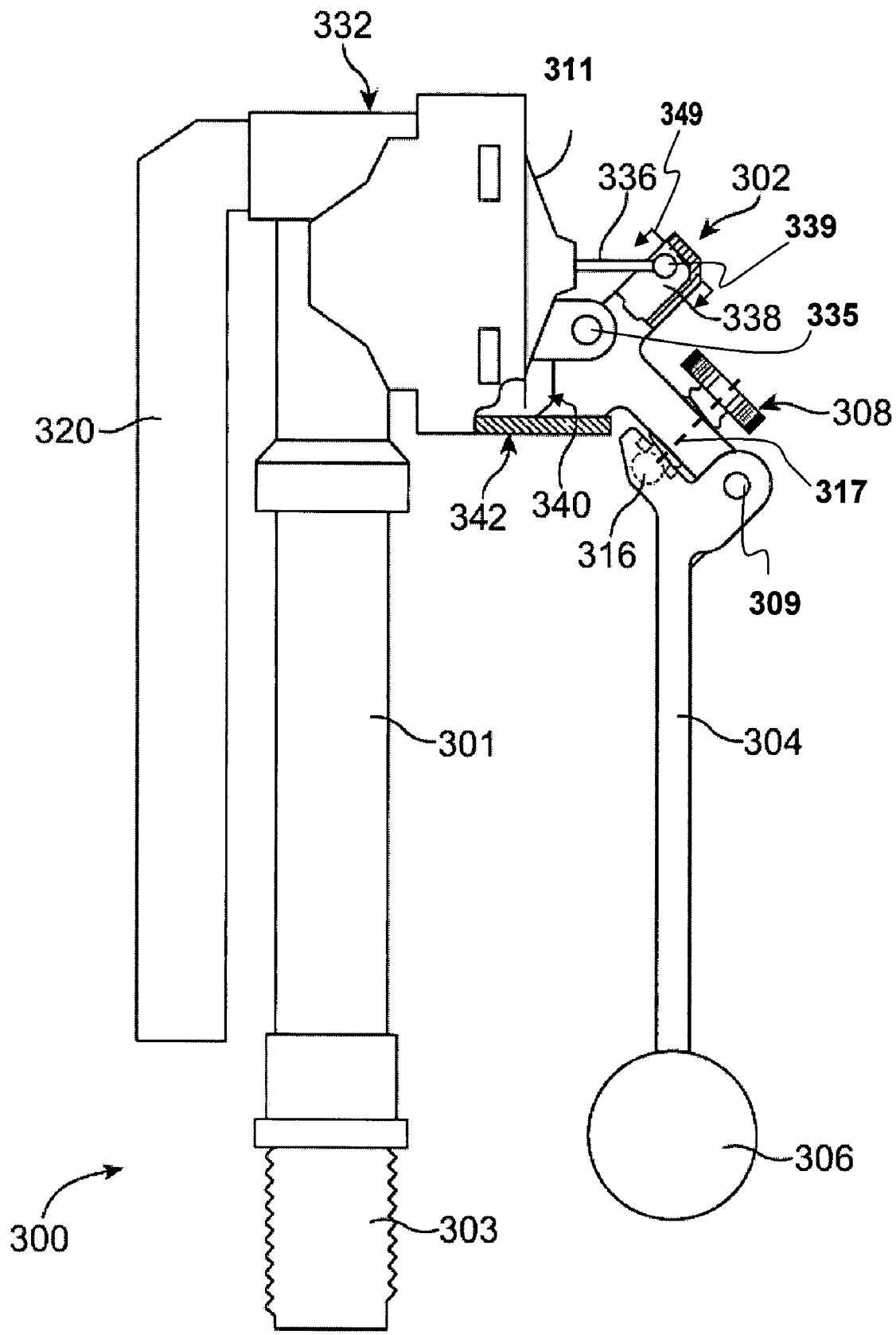
FIG. 3A is a side view of the third preferred embodiment of the ballcock valve system of the invention in its retracted position, wherein the ballcock valve as illustrated is a pilot-driven ballcock valve.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

A ballcock valve system according to the invention has adjustable positions for storage and packaging, and for adjusting water levels.

FIG. 1A is a side view of a first preferred embodiment of the ballcock valve system 100. The system 100 comprises a collapsible lever 130 coupled to a valve 140 and a buoyancy device 106. In the first preferred embodiment, the collapsible lever 130 comprises a first movable member 102, such as a proximal rod, and a second movable member 104, such as a distal rod, movably coupled to the first rod 102 at a hinge post 109. The second rod 104 is coupled to a floating device 106, such as a ball-shaped float at the other end. An adjusting member 108 is used to adjust desired angular positions of the second rod 104 in its operation position 142 with respect to the first rod 102. The buoyancy of the float 106 is relayed to a valve seal 110 through the second rod 104 and the first rod 102. The valve seal 110 is driven to close the valve opening 150 on the valve top 111. It is to be expressly understood that although the term "top" is used, the "valve top" is not necessarily located on the geometrical top of the valve system.

Although the first and second movable members are referred to as "rods" with reference to the drawings, it is to be expressly understood that any other shapes or structures can be used as the first and the second movable members. Further, although the first and second movable members as shown in the drawings are coupled using a hinge-type coupler, other types of coupling can be used. Furthermore, in place of the rotating movements, other types of extending and retracting movements can be used to achieve a collapsible floating apparatus without departing from the scope of the invention.

The first rod 102 has a seal means 110, such as a rubber pad, attached to a first end 103 of the first rod 102, for closing a pilot hole (not shown) on the valve top 111. The rubber pad 110 may be mounted on the first rod 102 through mounting means such as a hole or a hinge, and a receptacle.

As shown in FIGS. 1A and 1B, the adjusting member 108 may comprise a screw with an externally threaded section 114 screwed into an internally threaded section 115 near a second end 117 of the first rod 102. The adjusting member 108 has a knob 112 on one end and a lock head 116 on the other end. The knob 112 may be, for example, a disk knob with a series of radial serrations on the outer periphery to facilitate a better grip. The lock head 116 has an approximately conical shape in accordance with an embodiment of the invention. The adjusting member 108 may also have a post 118 to help secure the adjusting member 102 to the first rod 102 and to prevent free rotation of the knob 112 during operation. The post 118 may be, for example, square or hexagonal shaped.

In a collapsed or retracted position, e.g., during shipping or storage, the second rod 104 is in its collapsed, or downward, position 141. A snug thread fit may be used to secure the second rod 104 in the collapsed or retracted position 141 to avoid free turning motion of the second rod 104.

Prior to installation, the second rod 104 is moved, about the hinge post 109 and rotated relative to the first rod 102, to an operational position 142, and latches its receptacle slot 120, shown in FIG. 1C, onto the conical lock head 116 of the adjusting member 108. Switching the position of the second 104 as shown in the exemplary configuration in FIG. 1A is achieved by rotating the second rod 104 from an angle α to a greater angle β relative to the first rod 102. Consequently, the floating device 106 is moved from its retracted position 161 to its operation position 162.

It is to be expressly understood that other types of relative movements between the first rod and the second rod may be employed. For example, changing a relative position between the first rod 102 and the second rod 104 is not limited to changing the angular position as illustrated.

Thus, the first rod 102 and the second rod 104 are now rigidly joined to effectively become a single lever which, through the lever effect, facilitates the closing of the seal with the buoyancy force of the float 106.

As further illustrated in FIG. 1C, the receptacle 120 may be formed by a pair of jaws 121 and 122 extending from the end of the second rod 104. A pair of hinge posts 109 are formed on the jaws 121 and 122 to retain a hinge pin (not shown) through a hole (not shown) in the first rod 102, where the hole in the first rod 102 is aligned with the hinge posts 109.

The knob 112 may be turned to adjust the position of the lock head 116, which in turn adjusts the locked operation position 142 of the second rod 104, i.e., where the second rod 104 is caught and latched by the lock head 116, which in turn determines the water level in the toilet tank.

Beside piston-type ballcock valves, pilot-type ballcock valves may also be employed in toilet tanks. A valve top 211 is shown in FIGS. 2A and 2B. Unlike piston-type ballcock valves shown in FIG. 1A, the pilot-type ballcock valve 211 opens and closes horizontally.

Accordingly, a second preferred embodiment of the ballcock valve system 200 needs to translate a rotational motion of the rods into horizontal motion to drive the valve. This may be achieved, for example, by using a shuttle stem as shown later in FIG. 3A.

As shown in FIG. 2A, the valve system 200 also comprises a first rod 202, a second rod 204, and a floating device 206. Although the floating device 206 as shown is substantially triangle shaped, those of ordinary skill in the art will appreciate that any shape can be used for the float.

During storage or shipping, the valve system 200 is in a collapsed, or retracted, position, e.g., the float 206 as governed by the second rod 204 is retracted to a position 261 adjacent the valve body 201. This is achieved by retracting the first rod 202 to its collapsed position 241, securing the first rod 202 to its collapsed position 221 using a ratchet device 207 on the valve top 211, and unscrewing the adjusting member 208 to its outermost position. Accordingly, the floating device 206 is at its retracted position 261.

Before operation, the first rod 202 and the second rod 204 are rotated upward together, and the first rod 202 is released from the ratchet device 207. While the adjusting member 208 is at its outermost position, the float 206 settles to a first operational position 262.

Unlike in the first embodiment where the second rod is rotated relative to the first rod when switching from the collapsed position to an operational position, in the second embodiment, switching from the collapsed position to the operational position is achieved by rotating the first rod and the second rod together. Those of ordinary skill will appreciate that a combination of these two embodiments may be employed.

When the water tank is filled with water, the buoyancy force may raise the float 206 from the first operation position 262 to a raised position 264, while the first rod 202 and the second rod 204 together are raised as a lever.

When the adjusting member 208 is screwed inwardly, a tip 281 of the adjusting member 208 presses a first arm 241 of the second rod 204, which rotates about the hinge 209. Thus, the float 206 can be adjusted from a first operational position 262 to an adjusted operational position 263. Depending on the traveling range of the screw of the adjusting member 208, the operational position of the float 206 can be adjusted in a relatively large range. From the adjusted operational position 263, the float 206 can be raised by water to a position 265.

As shown in FIG. 2A and FIG. 2C, the system 200 may further comprise a discharge water chute 220, which may be rotatable to direct the water flow to different directions.

In a third preferred embodiment, the valve system of the invention provides a locking mechanism for catching the first rod in the storage or shipping position, and provides an elongated chamber to retain a ball-shaped head of the shuttle stem that drives the valve open or close horizontally.

As shown in FIG. 3A in a collapsed position, the third preferred embodiment of the ballcock valve system 300 comprises a valve body 332, a valve top 311, a valve main body 301, a water discharge tube 320 for discharging water to the tank, a threaded section 303 for securing the valve system 300 to the tank, a first rod 302, a second rod 304, and a floating device 306. The first rod 302 as shown has an overall "L" shape. The first rod 302 is hinged to the valve top 311 at a hinge post 335. The first rod 302 on one end is coupled to a shuttle stem 336 to open or close the valve horizontally, and on the other end is hinged to the second rod 304 using the hinge 309. The system 300 also has an adjusting member 308. The adjusting member 308 has a ball joint 316 coupled to the second rod 304 that allows a tip of the adjusting member 308 to turn inside the joint 316 about an axis 317 while retaining the tip of the adjusting member 308.

Figures 3B, 3C:
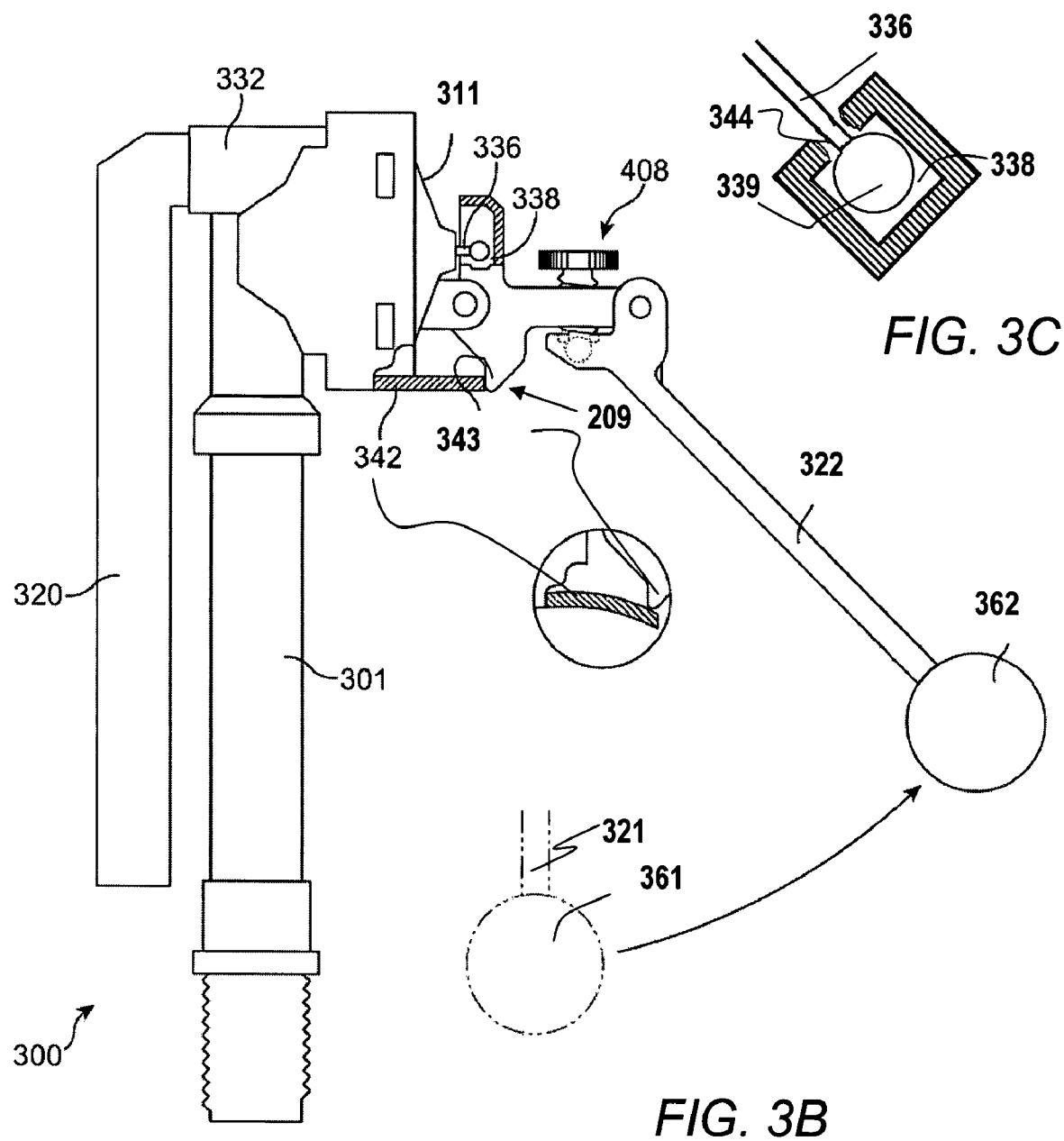
FIG. 3B is a side view of the third embodiment in its operational position.
FIG. 3C is a cross-sectional view of the elongated chamber retaining the head of the shuttle stem in the third embodiment.

The first rod 302 further comprises an elongated chamber 338 for retaining the enlarged head portion 339 of the shuttle stem 336. When viewed from the medial plane 349, as best illustrated in FIG. 3C, the enlarged head portion 339, shown as a substantially ball-shaped head, of the shuttle stem 336 has less freedom of movement in the lateral direction as compared with the elongated direction. Those of ordinary skill in the art will recognize that other shapes of the enlarged head portion 339 of the shuttle stem 336 may be used.

The chamber 338 has an elongated opening 344 that allows the shuttle stem 33644 to freely move along the elongated direction of the chamber, while the ball-shaped head 339, having a diameter larger than the width size of the opening 344, is retained in the elongated chamber 338. The head 339 is allowed to slide along the chamber 338 in the elongated direction. The chamber 338 and the head 339 may be lubricated with conventional lubricant. A rotational motion of the chamber 338, which is anchored to the first rod 302, pushes or pulls the head 339 in a substantially horizontal direction. The shuttle stem 336 in turn drives the pilot valve (not shown) horizontally open or close. Compared to conventional pilot-type valves employing a swivel joint, embodiments of the invention using the shuttle stem 336 has a reduced side load to the shuttle stem 336, and an increased valve sensitivity.

In the collapsed shipping or storage position as shown in FIG. 3A, a locking mechanism 340, is used to lock the first rod 302 into position. As shown in FIG. 4B, the locking mechanism 340 comprises a substantially triangle-shaped tip 343 on the first rod 302, and a cantilever arm 342 attached to the valve body 332.

When the second rod 304 is moved from the collapsed position 321 to the operational position 322 and the floating device 306 is brought from the retracted position 361 to its operational position 362, the tip 343 slides across a top surface of the cantilever arm 342 until the tip 343 locks at the end of the cantilever arm 342.

As shown in the inset to FIG. 4B, the cantilever arm 342 may be spring loaded when the locking mechanism 340 is in the transitional state. At the operational position, the cantilever arm 342 returns to its horizontal position and functions as a stop for the first rod 302.

Figure 4:
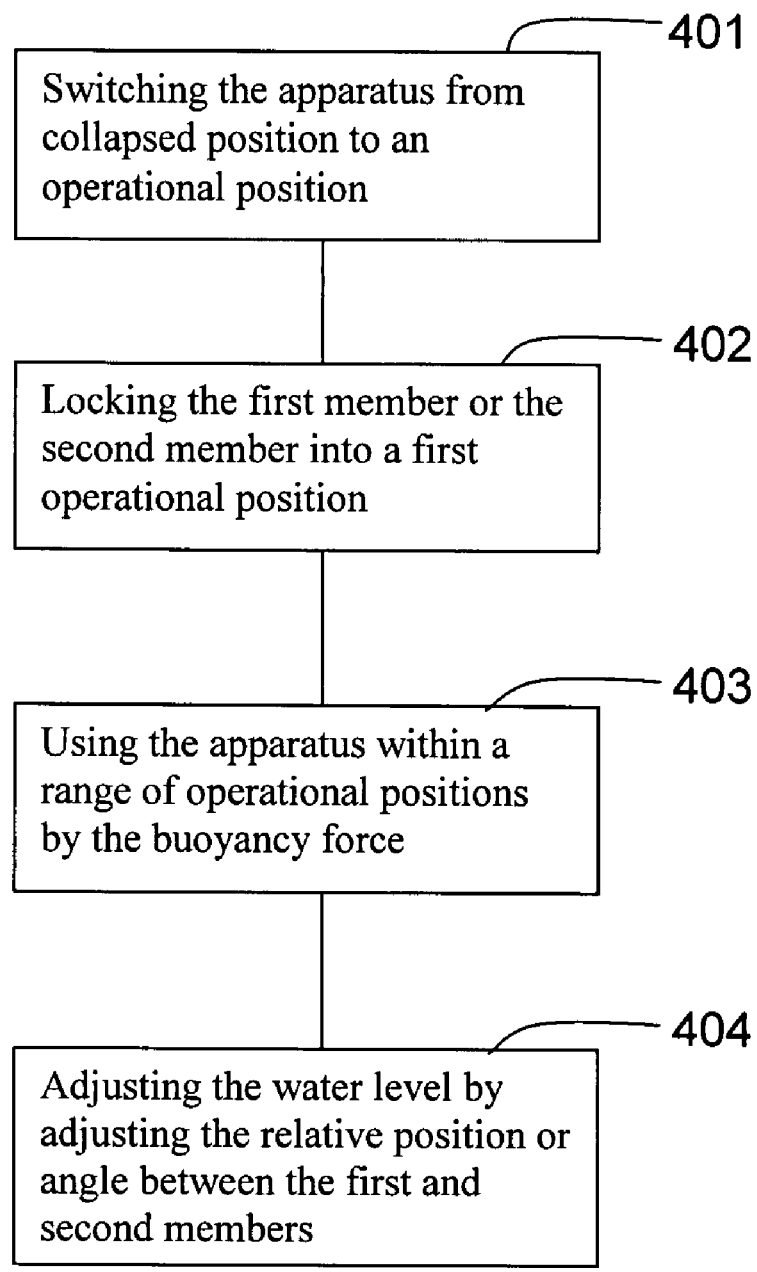
FIG. 4 is a diagram illustrating a preferred method of assembling and operating the ballcock valve system of the invention.

A method of assembling and operating the valve system according to the invention is summarized in the flowchart in FIG. 4. In step 401, the floating apparatus is transitioned from a collapsed position to an operational position. This can be achieved by rotating the second member relative to the first member as in the first preferred embodiment, or by rotating the first member together with the second member relative to the valve as in the second and third preferred embodiments. In step 402, the apparatus is locked into an operational position where the floating device is extended away from the valve main body. This may be realized by catching the second member with the adjusting member attached to the first member as in the first embodiment, by latching the first member onto a locking mechanism as in the second and third embodiments, or by a combination thereof. Now in an operational position, the apparatus can be used in an operational range by the buoyancy of the floating device in step 403. The operational position may be adjusted in step 404 by turning the adjusting member, thereby adjusting the water level in the tank.

Advantageously, the valve system in accordance with embodiments of the invention has a "collapsible" or "foldable" rod that is easy to store and set up. The configuration of the first rod and the second rod additionally provides a convenient way of adjusting the water level in a toilet tank.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what incorporates the essential idea of the invention.

What is claimed is:

1. A collapsible floating apparatus for controlling a ballcock valve, comprising:
    a floating device for providing a buoyancy to drive the valve;
    a collapsible lever coupled to the floating device and the valve, the collapsible lever comprising a first member movably coupled to the valve, and a second member movably coupled to the first member; wherein the collapsible lever is capable of being positioned substantially parallel to a longitudinal axis of the valve;
    an adjusting member for adjusting a relative position or angle between the first member and the second member;
    a locking mechanism for locking the second member with the first member when the second member is moved from a retracted position to an operational position;
    a lock head attached to a tip of the adjusting member, wherein the adjusting member is attached to the first member; and
    a receptacle slot on the second member for catching and retaining the lock head at the operational position, wherein the receptacle slot is formed with two jaws extending from an end of the second member, each jaw having a hinge post, and wherein the hinge posts are adapted to receive a hinge pin coupled with the first member for rotatably coupling the first member with the second member, and the lock head is substantially conically shaped.

2. A collapsible floating apparatus for controlling a ballcock valve, comprising:
    a floating device for providing buoyancy to drive the valve;
    a collapsible lever coupled to the floating device and the valve, the collapsible lever comprising a first member movably coupled to the valve, and a second member movably coupled to the first member; wherein the collapsible lever is capable of being positioned substantially parallel to a longitudinal axis of the valve;
    an adjusting member for adjusting a relative position or angle between the first member and the second member;
    a locking mechanism for locking the second member with the first member when the second member is moved from a retracted position to an operational position;
    a lock head attached to a tip of the adjusting member, wherein the adjusting member is attached to the first member; and
    a receptacle slot on the second member for catching and retaining the lock head at the operational position, wherein the receptacle slot is formed with two jaws extending from and end of the second member, each jaw having a hinge post, and wherein the hinge posts are adapted to receive a hinge pin coupled with the first member for rotatably coupling the first member with the second member, and the lock head is substantially conically shaped;
    wherein the adjusting member comprises an adjusting knob and an externally threaded section that mates through an internally threaded section of the first member and connects to the lock head.

* * * * *